June 4, 1968 R. A. KAPLAN 3,386,787
MACROSCOPIC OPTICAL WAVEGUIDES
Filed Oct. 25, 1963 3 Sheets-Sheet 1

June 4, 1968   R. A. KAPLAN   3,386,787
MACROSCOPIC OPTICAL WAVEGUIDES
Filed Oct. 25, 1963   3 Sheets-Sheet 3

United States Patent Office 3,386,787
Patented June 4, 1968

3,386,787
MACROSCOPIC OPTICAL WAVEGUIDES
Robert A. Kaplan, Flushing, N.Y., assignor to Hazeltine Research, Inc., a corporation of Illinois
Filed Oct. 25, 1963, Ser. No. 318,970
1 Claim. (Cl. 350—96)

This invention relates to macroscopic optical waveguides. For purposes of this specification, "macroscopic optical waveguides" are defined as waveguides with dimensions at least one order of magnitude greater than the wavelength of light, so that these waveguides are visible to the naked eye. In general, such waveguides will have cross-sectional dimensions of 10–100 wavelengths (10–100 microns or 0.4–4.0 mils).

The recent development of the laser provides a source of coherent radiation at optical frequencies. Contemplated applications of this "coherent light" include optical systems similar to present radar and communication systems operating at microwave frequencies. However, to provide the degree of sophistication presently obtainable at microwave frequencies, it is necessary to have high performance optical components. One approach to the design of these components, which parallels the approach presently employed at microwave frequencies, is to consider waveguide-type components.

Classical optical components generally rely on the principles of geometric and physical optics. They are usually unbounded, multimode, passive devices. In contrast, microwave components are usually constructed in bounded media and relie on well defined field configurations in single-mode or controlled-multimode waveguides. These microwave components provide accurate control of the spatial characteristics and polarization of the electromagnetic fields and are capable of operation over either narrow or wide frequency bands as required. Such components permit the construction of sophisticated devices capable of performing many specialized functions. Examples of such prior art microwave devices include filters, diplexers, duplexers, circulators, comparison circuits, monopulse antenna feeds, etc.

As system concepts at optical frequencies develop, the need for precision components will increase. Components such as hybrid junctions, directional couplers, narrow-bandwidth filters, phase shifters, attenuators, impedance-matched terminations, detectors, isolators, modulators and power amplifiers will be needed to implement guidance, tracking and communications systems. These basic optical components will be combined to form assemblies similar to the sophisticated devices listed above for microwave frequencies.

As already mentioned, an approach to the problem of design of sophisticated optical components is to consider components based on waveguide approach. Obviously this approach requires a waveguide medium as the basic building block for component fabrication. A variety of transmission media capable of propagation of optical frequency signals have been suggested in the prior art. These media include free-space, metallic waveguides and dielectric fibers. Each of these are subject to certain disadvantages when used as the basic structure for component fabrication.

The most common medium for transmission of optical energy is free-space. Low-loss, passive components with designs based on the principles of geometric optics are well known. However, components in this unbounded medium are often cumbersome and difficult to align. Furthermore, since free-space is essentially a multimode medium, the performance of these components is highly dependent on the angle of incidence of the optical signals and sufficient control is extremely difficult to obtain in some applications. Similarly, some type of components such as hybrid junctions are not considered to be possible of design in free-space.

Metallic waveguides are probably not feasible at optical frequencies. A single-mode waveguide would require dimensions of the order of one micron; larger waveguides would support a very large number of modes in uncontrolled fashion. Furthermore at optical frequencies, small metallic waveguides would be subject to high losses.

Propagation of optical signals by microscopic fibers is feasible and has been demonstrated. These fibers are dielectric waveguides whose across-sectional dimensions are of the order of one micron for single-mode operation. However, in general these fibers are considered to be too small to permit fabrication of sophisticated components and to allow efficient excitation and power transmission.

To permit the practical design and fabrication of optical components using the waveguide approach, the waveguide must meet three primary requirements. It must operate in a single-mode or controlled-multimode fashion to prevent signal distortion and allow establishment of specific field patterns; it should have sufficiently large dimensions to achieve effective excitation and reasonable power capabilities; and it must have practical dimensions and tolerances for feasibility of component fabrication.

Objects of this invention are to provide new and improved macroscopic optical waveguides and macroscopic optical waveguides which meet the requirements noted above.

In accordance with the invention, a macroscopic optical waveguide for propagating predetermined modes in a band of optical frequencies having a maximum wavelength $\lambda_c$ which comprises a first horizontal planar surface maintained at a first temperature; a second conductive planar surface arranged in spaced parallel relation a distance greater than $d$ below the first surface and maintained at a temperature lower than the first temperature; and a gas maintained between the surfaces; the waveguide being so constructed and arranged that $$\frac{3\lambda_c(m'+\tfrac{3}{4})}{4\sqrt{k_0-k_d}} > d > \frac{3\lambda_c(m+\tfrac{3}{4})}{4\sqrt{k_0-k_d}}$$

where $m$ is the number of the highest mode to be propagated, $m'$ is the number of the next highest mode, $k_0$ is the dielectric constant of the gas at the second surface and $k$ is the dielectric constant of the gas at the first surface; whereby, if light of frequency within the band of frequencies is introduced into the waveguide, the predetermined modes will propagate along the waveguide while higher modes will be dissipated.

For a better understanding of the present invention, together with other and further objects thereof, reference is had to the following description taken in connection with the accompanying drawings, and its scope will be pointed out in the appended claim.

FIG. 1 waveguide

Figure 1:
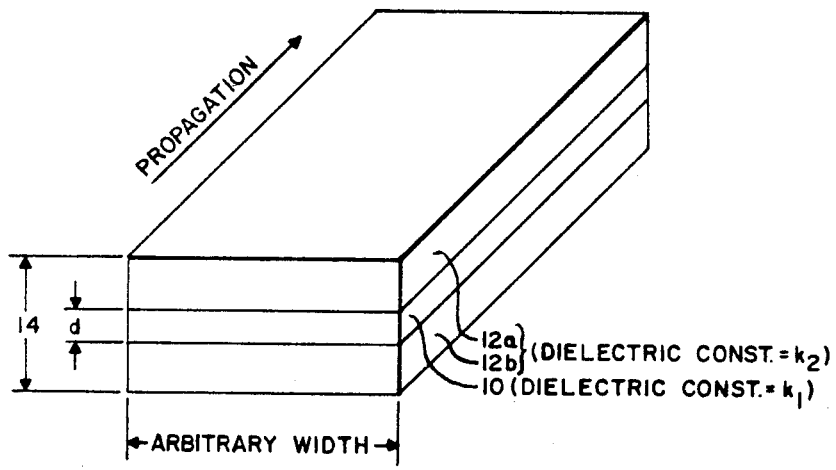
FIG. 1 shows a portion of a macroscopic optical waveguide constructed in accordance with the invention.

Referring now to FIG. 1, there is shown one example of a macroscopic optical waveguide for propagating predetermined modes in a band of optical frequencies having a maximum wavelength $\lambda_c$. This waveguide includes a core region 10 having a transverse dimension $d$ of many optical wavelengths. In this specification the term "transverse dimension" refers to a dimension perpendicular or transverse to the direction of wave propagation in a waveguide. This direction is indicated in FIG. 1 by the arrow labeled "Propagation." The region 10 has a dielectric constant $k_1$. As shown in FIG. 1, the waveguide also includes an outer region 12 which partially surrounds the core region 10.

More specifically, in the illustrated embodiment, the core region 10 is shown as having two parallel planar boundaries separated by the dimension $d$ and the outer region 12 is shown as comprising two portions 12a and 12b having the same two planar boundaries in common with the core region 10. The portions 12a and 12b of the outer region have a dielectric constant $k_2$ which is lower than the dielectric constant $k_1$ of the core region 10. The outer region 12 has an over-all transverse dimension 14 which may be ten or more times as large as the dimension $d$. The relationship between the various parameters involved is such that $$\frac{\lambda_c m'}{q\sqrt{k_1-k_2}} > d > \frac{\lambda_c m}{b\sqrt{k_1-k_2}} \qquad (1)$$

where $m$ is a constant corresponding to the highest mode to be propagated and $m'$ is a constant corresponding to the next highest mode. Computation of the values of $m$ and $m'$ for particular modes and waveguide configurations will be discussed below. In the above relation, $b$ is a constant determined by the waveguide geometry and will also be discussed in greater detail below.

Figure 2:
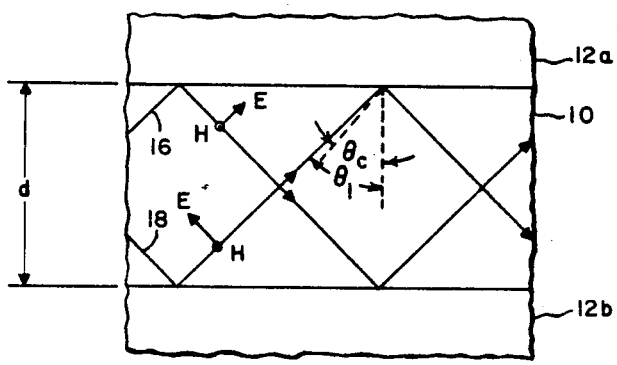
FIGS. 2, 3, 4a, 4b, 4c, 4d and 5 are diagrams useful in describing principles and operation of macroscopic optical waveguides constructed in accordance with the invention with particular reference to the FIG. 1 waveguide.
Figure 3:
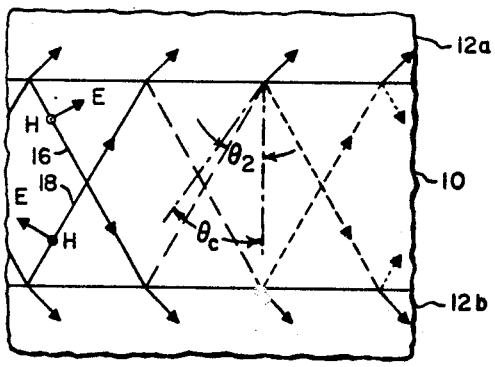
Figure 4A:
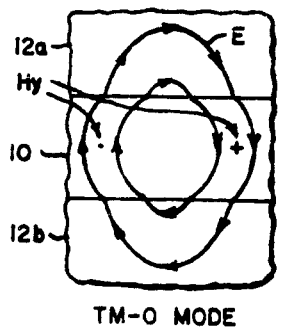
Figure 4B:
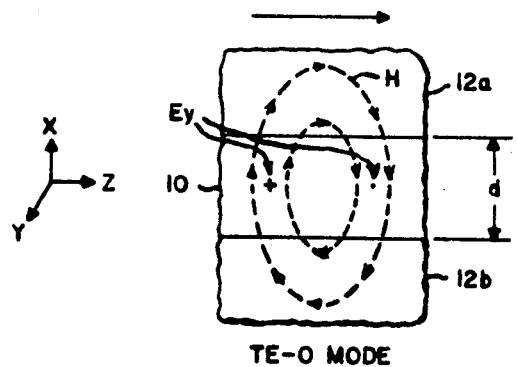
Figure 4C:
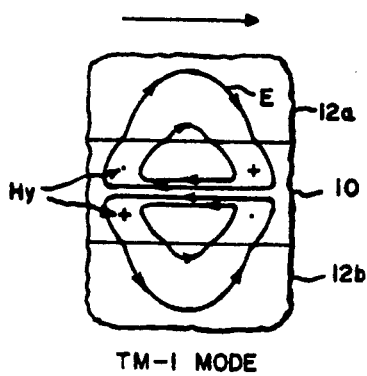
Figure 4D:
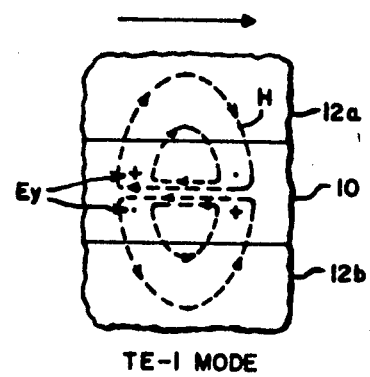

FIGS. 2 and 3 are expanded side views of a portion of the FIG. 1 waveguide with information added for use in analyzing propagation of light waves by application of the concepts of ray theory. It is assumed that light waves enter the core region 10 from the left. In FIGS. 2 and 3 the internal fields are resolved into two plane TEM waves 16 and 18 which reflect from the planar interface boundaries at some angle $\theta$. Electric and magnetic vectors are indicated by standard notation in FIGS. 2 and 3. There is a critical angle $\theta_c$ above which all power is reflected (total internal reflection). This angle is defined as follows:

$$\sin \theta_c = \sqrt{\frac{k_2}{k_1}} \qquad (2)$$

where $k_1$ is greater than $k_2$. In FIG. 2 the angle $\theta_1$ is greater than $\theta_c$ so that total internal reflection does occur.

In FIG. 3 there is shown the result when propagation is at an angle such as $\theta_2$ which is smaller than $\theta_c$. At angles less than $\theta_c$ some power escapes at each reflection. This loss of power appears as an attenuation in the direction of propagation.

For any given wavelength, only certain angles of incidence $\theta$ will simultaneously satisfy the boundary conditions at both interfaces. The field configurations corresponding to propagation at these angles are termed "modes." Modes associated with incidence below the critical angle are termed "leaky" modes. For incidence above the critical angle they are known as propagating modes. Propagating modes travel along the waveguide substantially without loss. Leaky modes are attenuated as they travel along the waveguide due to the power loss at each reflection as discussed above. The magnitude of this attenuation is such that when an appreciable length of waveguide is involved, it can be said that the leaky modes do not propagate along the waveguide.

To determine the dimension $d$ required for propagation of any particular mode at a particular wavelength, it is first noted that for a fixed critical angle there are a series of critical thicknesses $D_m$, each such thickness corresponding to a different mode of propagation. For waveguides having a dimension $d$ larger than the critical thickness $D_m$, the mode propagates; for $d$ less than the critical thickness, the mode does not propagate.

The relation between the critical thickness $D_m$ for a given mode and the difference in the dielectric constants is:

$$D_m = \frac{\lambda m}{2\sqrt{k_1-k_2}} = \frac{\lambda m}{2\sqrt{\Delta k}} \qquad (3)$$

The definitions of the symbols used above and in subsequent equations follow in a single listing for convenience of reference:

$\theta$ = angle of incidence
$\theta_c$ = critical angle
$\lambda$ = free-space wavelength
$\lambda_c$ = free-space critical wavelength
$d$ = thickness (or diameter)
$D_m$ = critical thickness for mode of order $m$
$k_1$ = dielectric constant of core region
$k_2$ = dielectric constant of outer region
$\Delta k = k_1 - k_2$
$k_0$, $k_d$ = dielectric constant at heights 0 and $d$ respectively
$\mu_{nm}$ = $m^{th}$ root of $n^{th}$ order Bessel function
$m$ = constant related to the mode involved ($m$ equals the mode number for FIG. 1 type waveguide)
$b$ = constant related to waveguide geometry ($b=2$ for FIG. 1 type waveguide; $b=\pi$ for FIG. 6 type waveguide)
$\rho$ = voltage reflection coefficient
$\alpha$ = attenuation coefficient Equation 3 indicates that the critical thickness of the core region 10 for any given mode may be increased by decreasing the difference in dielectric constants. By choosing $\Delta k$ to be small, $D_m$ may be many wavelengths even for low values of the mode number $m$. The dominant modes in the FIG. 1 waveguide correspond to $m=0$. These dominant modes will propagate in a core region 10 of any thickness. It is this property which permits the construction of large single-mode dielectric waveguides. The waveguide thickness is chosen large enough so that the dimensions are macroscopic, yet small enough so that the second and higher order modes ($m=1, 2, 3$, etc.) are leaky. The dominant modes will of course propagate in this waveguide; however, the higher order modes will be rapidly attenuated in the direction of propagation so that, as a practical matter, it is accurate to say that these higher order modes do not propagate along the waveguide.

Figure 5:
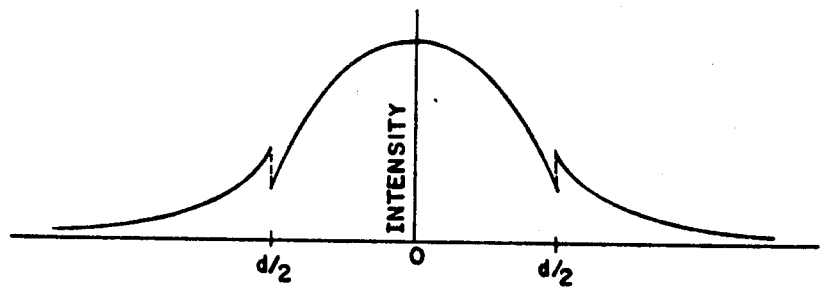

There exist two general classes of modes, TM and TE. FIGS. 2 and 3 show a TM mode; the electric vector is in the plane of the page and the magnetic vector is normal to the page at right angles to the electric vector. For a TE mode, the directions of the electric and magnetic vectors are interchanged. For each value of $m$ there exists both a TM mode and a TE mode. The field configuration for the lower order modes TM-0, TE-0, TM-1 and TE-1 are shown in FIGS. 4a, 4b, 4c and 4d respectively. The transverse electric field for the dominant TM mode (TM-0) is shown in FIG. 5. As mentioned, Equation 3 indicates that for the first two modes, TM-0 and TE-0 ($m=0$ for both), the critical thickness of the core region 10 is zero. This implies that propagation without leakage may occur in a waveguide having an infinitely thin core region. Alternatively, for a given thickness the equation yields an infinite critical wavelength or effectively, permits propagation at zero frequency. For true single-mode propagation either the TM or TE mode can be selectively excited by controlling the polarization of the incident wave.

When only a single propagating mode exists in a waveguide of the type under discussion all higher modes are leaky modes. For true single-mode propagation, these leaky modes must be rapidly attenuated in the direction of propagation. The attenuation of these modes may be computed from the reflection loss at the interface. The reflection coefficient at a dielectric interface for a TM mode is:

$$\rho = \frac{\frac{k_1}{k_2}\sqrt{1 - \Delta k \left(\frac{2d}{\lambda m}\right)^2} - 1}{\frac{k^1}{k_2}\sqrt{1 - \Delta k \left(\frac{2d}{\lambda m}\right)^2} + 1} \quad (4)$$

By considering the distance between reflection, the attenuation coefficient $\alpha$ may be obtained:

$$\alpha = -\frac{2}{d \tan \theta} \, 10 \log_{10} \rho \quad (5)$$

In addition to this loss, both propagating and leaky modes suffer a small attenuation due to dielectric losses.

The transverse electric field for the dominant mode is shown in FIG. 5. Field variations are sinusoidal in the core region 10. In region 12 the fields decay exponentially.

As indicated in the field plot of FIG. 5, a portion of the power actually propagates in outer dielectric region 12. As shown, the transverse electric field is discontinuous at the interface; the discontinuity is proportional to $k_2/k_1$ and is negligible for small $\Delta k$. The other field variations are continuous. These results are not obtained by applying the concepts of ray theory, but may be obtained by utilizing more detailed techniques such as the method of transverse resonance or an exact solution of Maxwell's equations in this geometry.

For operation at a wavelength of 1 micron, a core thickness of 0.045 millimeter and $\Delta k$ of 0.0001 are values which may practically be achieved. The angle of incidence for the $m=0$ modes is above the critical angle; therefore, these modes experience total internal reflection and propagate efficiently. Any attenuation is due to dissipation in the dielectric and may be held to the order of 0.1 db per centimeter. The angle of incidence for the nonpropagating modes ($m=1$ or higher) is below the critical angle; therefore, these higher order modes are not totally reflected and are leaky modes. These higher order modes are attenuated due to the loss of power via the refracted wave and may suffer an attenuation of the order of 32.5 db per centimeter, which is greatly in excess of the attenuation of the propagating modes. In the transverse direction the fields of the propagating mode decay exponentially at the rate of 20 db per $d$, so that the cladding need only be a few times as thick as the core to permit efficient propagation.

A portion of waveguide which was successfully constructed and tested had an appearance generally similar to that of FIG. 1. Outer region 12 was in the form of two slabs of optical quality glass with optically flat surfaces and having a dielectric constant $k_2$ of approximately 2.295. The core region 10 was a liquid in the form of a mixture of benzene (dielectric constant of approximately 2.244) and chlorobenzene (dielectric constant of approximately 2.310). The dielectric constant $k_1$ of the core region was adjusted by varying the proportion of the two components and observing the operation of the waveguide when excited by a beam of coherent light incident on the waveguide. The important parameters of this waveguide were essentially as follows:

| Parameter | Symbol | Typical Value |
| --- | --- | --- |
| Design wavelength | $\lambda$ | 1 micron. |
| Thickness | $d$ | 0.045 mm. |
| Dielectric constant | $k$ | ≈2.25. |
| Difference in $k$ ($k_1 - k_2$) | $\Delta k$ | 0.0001. |
| Propagating modes ($m=0$) | | TM-0, TE-0. |
| Critical thickness ($m=1$) | $d_c$ | |
| TM-1, TE-1 | | 0.05 mm. |
| Critical angle | $\theta_c$ | 89.333°. |
| Mode angle | $\theta$ | |
| TM-0, TE-0 | | 89.367°. |
| TM-1, TE-1 | | 88.734°. |
| Exponential field decay | | 20 db/$d$. |
| Attenuation | $\alpha$ | |
| TM-0, TE-0 | | ≈0.1 db/cm. |
| TM-1, TE-1 | | ≈32.5 db/cm. |

In principle, controlled-mode waveguide of any size may be constructed by choosing the correct $\Delta k$. As a practical matter, since a larger waveguide requires a smaller $\Delta k$, a dimension $d$ of 50 wavelengths (approximately 0.05 millimeter) with a corresponding $\Delta k$ of approximately 0.0001 are considered to be practical magnitudes. A smaller size increases fabrication difficulties while a larger size requires values of $\Delta k$ which are considerably harder to achieve and maintain.

Figure 6:
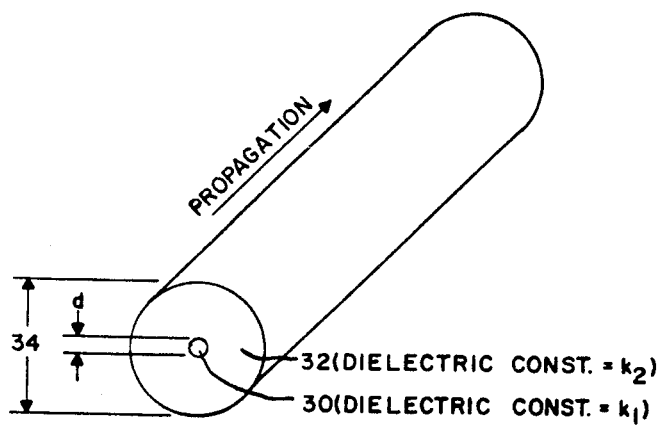
FIGS. 6, 7, 8a and 8b show different forms of macroscopic optical waveguides constructed in accordance with the invention.

*FIG. 6 waveguide*

Referring now to FIG. 6, there is shown another type of optical waveguide, constructed in accordance with the invention, for propagating predetermined modes in a band of optical frequencies having a maximum wavelength $\lambda_c$. As shown, this waveguide includes a core region 30 which has the shape of a right circular cylinder of diameter $d$ and which has a dielectric constant $k_1$. Diameter $d$ has a magnitude of many optical wavelengths. For example, $d$ may be equal to approximately 50 optical wavelengths.

The FIG. 6 waveguide also includes an outer region 32 radially surrounding the core region 30. That is to say, outer region 32 does not surround the ends of region 30 but is coaxial with region 30. Outer region 32 has a dielectric constant $k_2$ which is lower than the dielectric constant $k_1$. Outer region 32 is many optical wavelengths thick, so that dimension 34 might, for example, equal 500 optical wavelengths. The actual external shape of the outer portion 32 is not important; however, it is considered preferable that the minimum over-all dimension 34 be of the order of ten times dimension $d$.

The relationship between the various parameters of the FIG. 6 waveguide is such that $$\frac{\lambda_c m'}{\pi \sqrt{k_1 - k_2}} > d > \frac{\lambda_c m}{\pi \sqrt{k_1 - k_2}} \quad (6)$$

where $m$ is a constant corresponding to the highest mode to be propagated and $m'$ is a constant corresponding to the next highest mode. The waveguide is thus so constructed and arranged that if light of frequency within the aforementioned band of frequencies is introduced into the waveguide, the predetermined modes will propagate along the waveguide while higher modes (higher than $m$) will be dissipated.

The operation of the FIG. 6 circular waveguide is similar to the above-described operation of the FIG. 1 waveguide. Whereas for the FIG. 1 slab configuration the value of $b$ in Equation 1 was 2, for the FIG. 6 circular configuration the value of $b$ is $\pi$. Also, whereas for the FIG. 1 slab configuration, the value of $m$ in Equation 1 was an integer identical to the number of the mode involved, for the FIG. 6 circular configuration the value of $m$ is still a constant corresponding to the mode involved, but is not identical to the mode number. For the FIG. 6 circular configuration $m$ is equal to the $p^{th}$ root of the $n^{th}$ order Bessel function and is tabulated below for several modes using standard mode notation.

| $m$: | Associated modes |
| --- | --- |
| 0 | HE-11. |
| 2.405 | TE-01; TM-01; HE-21. |
| 3.832 | EH-11; HE-12; HE-31. |
| 5.136 | EH-21; HE-41. |
| 5.520 | TE-02; TM-02; HE-22. |
| 6.380 | EH-31; HE-51. |
| 7.016 | HE-13; EH-12; HE-32. |
| 7.588 | EH-41; HE-61. |
| 8.417 | EH-22; HE-42. |
| 8.654 | TE-03; TM-03; HE-23. |
| 8.771 | EH-51; HE-71. |
| 9.761 | EH-32; HE-52. |

Since the HE-11 (dominant) mode has $m=0$, there is no low frequency limit. The same result was noted above with reference to the FIG. 1 configuration.

FIG. 7 Waveguide

Figure 7:
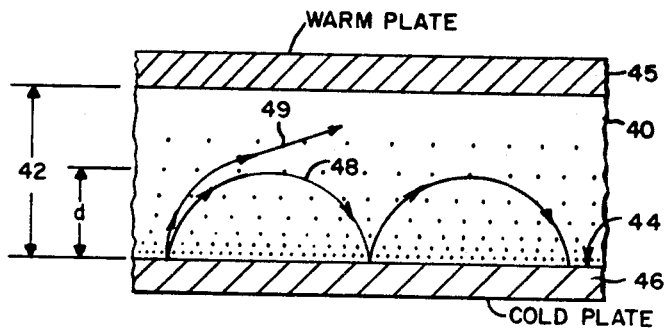

Referring now to FIG. 7 there is shown a side view of another type of optical waveguide, constructed in accordance with the invention, for propagating predetermined modes in a band of optical frequencies. As shown, this waveguide includes a region 40 having a transverse dimension 42 of many optical wavelengths and having a gradient of dielectric constant along said transverse dimension 42. In FIG. 7, this gradient, or variation, of dielectric constant in region 40 is indicated by dots whose density per area gives an indication of relative dielectric constant. Thus as shown, the dielectric constant is relatively higher at the bottom of the region 40 as compared to the top of region 40.

The FIG. 7 waveguide also includes a planar conductive 44, shown as comprising the top surface of plate 46, arranged perpendicular to the transverse dimension 42 and forming a boundary of region 40 at the point of highest dielectric constant.

Any medium with a gradient of dielectric constant in the transverse direction may be utilized as shown to form an optical waveguide. The effect produced by such a medium is similar to the well-known ducting or trapping effect in atmospheric propagation at microwave frequencies. In operation the varying dielectric constant causes a continual refraction of the light rays. The rays are gradually bent toward the ground plane formed by conductive surface 44 as shown in FIG. 7. For a region 40 having a linear variation of dielectric constant in the transverse direction, the relationship between the various parameters is such that $$\frac{3\lambda_c(m'+\frac{3}{4})}{4\sqrt{k_0-k_d}} > d > \frac{3\lambda_c(m+\frac{3}{4})}{4\sqrt{k_0-k_d}} \qquad (7)$$

where $m$ is the number of the highest mode to be propagated, $m'$ is the number of the next highest mode, $k_0$ is the dielectric constant of region 40 at the conductive surface 44 and $k_d$ is the dielectric constant at height $d$ in FIG. 7, and where $k_0$ is approximately 1.

As shown by ray 48 in FIG. 7, the lower modes will repeatedly bend in region 40 and be reflected from surface 44. Higher modes turn at greater heights (as shown by ray 49) and therefore a thickness can be chosen which propagates only the desired modes. Higher modes will not turn and will be attenuated in the direction of propagation.

Figure 8A:
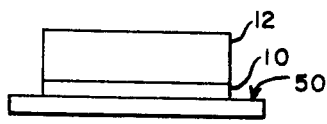
Figure 8B:

FIGS. 8a and 8b waveguides

Referring now to FIGS. 8a and 8b, there is illustrated another approach to be constructed of optical waveguides in accordance with the invention. FIG. 8a shows a cross-section of a waveguide of the type shown in FIG. 1, which has been bisected by a planar conductive surface 50. FIG. 8b shows a cross-section of a waveguide of the type shown in FIG. 6, which has been bisected by a planar conductive surface 52.

The theory of operation of the waveguides of FIGS. 8a and 8b is similar to that discussed with reference to FIGS. 1 and 6. It is a well-known principle of transmission line theory that a wave transmission media can be bisected by a conductive surface without destroying transmission capabilities. In the present case, one advantage of the conductive surface is to eliminate modes which have the electric field tangential to the conductive surface. Furthermore, as a practical matter, it may be easier to fabricate the bisected configuration.

General

In the design and fabrication of optical waveguides in accordance with the invention, small over-all dimensions and close control of dimensions and material parameters are involved.

The most important parameter is the difference in dielectric constant between the core region and the outer region of a waveguide. The operation of an optical dielectric waveguide is dependent on the accurate maintenance of the required $\Delta k$. Therefore, the dielectric constant itself is the most critical parameter and any variation will impair the performance of a waveguide. If $\Delta k$ is 0.0001, the tolerance on dielectric constants must be within about 0.00001 throughout the material. This homogeneity is more or less inherent in fluids. In solids it is difficult to obtain except in the best optical glass.

Most materials have some variation of dielectric constant with frequency. This variation must be considered during the design of dielectric waveguide components. However, materials with similar dispersion characteristics may be utilized to reduce the variation of $\Delta k$ with frequency.

All materials undergo some variation of dielectric constant with temperature. For many solids, such as optical glass, this is a small but significant change, for example, about 0.00001/° C. Some materials, particularly liquids, exhibit a large variation; carbon disulphide, for example, has a variation of about 0.004/° C. Some of this variation results from the change of density with temperature and can be minimized by restricting the expansion of the material; temperature control will also reduce the variation. Furthermore, the utilization of materials with similar temperature coefficients of dielectric constant would reduce the temperature dependence of $\Delta k$.

Glass is one of the first materials to be considered for optical waveguide construction. Its properties are well known and it is readily available. Some imperfections are inherent in ordinary optical glass as a result of manufacturing process. These imperfections could act as discontinuities in a waveguide and would effect waveguide action depending on their size and orientation. Although imperfection may exist in some types of glass, precision optical glass which is suitable for waveguide fabrication is available.

A variety of possible liquids and gases can be used in a dielectric waveguide. Gases have the advantage of low loss, while liquids have design and fabrication advantages. The dielectric constant of a liquid may be adjusted by dissolving other materials in it. Liquids also simplify waveguide fabrication since they conform to the surfaces with which they come in contact. Discussion of a few specific types of waveguides follows.

One waveguide design utilizes two gases of different dielectric constants. Such a two-gas waveguide is desirable from loss considerations, since the loss tangent of gases is less than that of liquids or solids. Pure gases are homogeneous and have well known dielectric constants. The two gases must be separated, as for example by the use of self-supporting dielectric sheets thinner than one-quarter wavelength.

One configuration of a variable dielectric waveguide utilizes a plate such as 46 in FIG. 7 which is cooled, a gas 40, and a warm top plate 45 covering the gas, to produce a controlled gradient of dielectric constant in the gas. Plate 46 would have a conductive reflecting surface such as 44, and the top plate 45 would have an absorptive surface so as to absorb high modes which were not turned (as ray 49 in FIG. 7). Such a "hot plate" waveguide is also a low loss gaseous system. The temperature difference between the plates establishes a density gradient across the waveguide. Therefore, the dielectric constant, which is proportional to density, is higher near the cold plate. This waveguide is sensitive to position; the cold plate must be on the bottom. External heating or cooling, or both, are required to maintain the temperature difference. Accurate control of the necessary temperature difference is essential.

Another waveguide design utilizes sections of optical glass of different dielectric constant. Such optical glass waveguide is desirable from an application standpoint, since temperature and position are less important. However, optically smooth interfaces are required to eliminate air gaps between the dielectrics and to prevent scattering of the propagating wave. A permanent strain introduced during fabrication would affect the required homogeneity.

Crystalline waveguides similar to the preceding optical glass waveguides are another type. The well-known change in dielectric constant with optical orientation of a uniaxial crystal is utilized to obtain the required $\Delta k$. A similar arrangement would utilize the well-known Kerr electro-optic effect in a liquid.

Liquid-solid combination waveguides appear to be the simplest to construct with the present techniques. Liquid-solid systems using either a liquid core region and solid outer region, or vice-versa, require optical smoothness of the interface surfaces of the solid to prevent scattering. However, air gaps are not possible. The dielectric constant of the liquid is inherently homogeneous and may be easily controlled by dissolving other liquids or solids in it, as in the previously-mentioned waveguide using glass and a mixture of adjustable portions of benzene and chlorobenzene.

For all of these waveguide types, a number of geometries are possible. In general, the rod and planar geometries are the simplest to analyze and fabricate, but it will be obvious that other geometries such as elliptical, tubular, etc., may be desirable in particular applications.

While there have been described what is at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:
1. A macroscopic optical waveguide for propagating predetermined modes in a band of optical frequencies having a maximum wavelength $\lambda_c$ comprising:

a first horizontal planar surface maintained at a first temperature;
a second conductive planar surface arranged in spaced parallel relation a distance great than $d$ below said first surface and maintained at a temperature lower than said first temperature;
and a gas maintained between said surfaces;
the waveguide being so constructed and arranged that $$\frac{3\lambda_c(m'+\tfrac{3}{4})}{4\sqrt{k_0-k_1}} > d > \frac{3\lambda_c(m+\tfrac{3}{4})}{4\sqrt{k_0-k_1}}$$

where $m$ is the number of the highest mode to be propagated, $m'$ is the number of the next highest mode, $k_0$ is the dielectric constant of the gas at said second and $k$ is the dielectric constant of the gas at said first surface;
whereby, if light of frequency within said band of frequencies is introduced into the waveguide, said predetermined modes will propagate along said waveguide while higher modes will be dissipated.

References Cited
UNITED STATES PATENTS

| | | | |
|---|---|---|---|
| 2,595,078 | 4/1952 | Iams | 333—95 |
| 2,721,312 | 10/1955 | Grieg et al. | 333—84 |
| 3,157,726 | 11/1964 | Hicks et al. | 88—1 |
| 3,308,394 | 3/1967 | Snitzer et al. | 333—83 XR |

OTHER REFERENCES

Journal of the Optical Society of America, "Observed Dielectric Waveguide Modes in the Visible Spectrum," by E. Snitzer et al., vol. 51, No. 5, May 1961, pp. 499–505.

HERMAN KARL SAALBACH, *Primary Examiner.*

ELI LIEBERMAN, *Examiner.*

M. L. NUSSBAUM, *Assistant Examiner.*